(12) United States Patent
Roecker et al.

(10) Patent No.: US 9,518,516 B2
(45) Date of Patent: Dec. 13, 2016

(54) STATE-BASED DIESEL FUELING FOR IMPROVED TRANSIENT RESPONSE IN DUAL-FUEL ENGINE

(71) Applicant: Southwest Research Institute, San Antonio, TX (US)

(72) Inventors: Ryan C. Roecker, Fair Oaks Ranch, TX (US); Jayant V. Sarlashkar, San Antonio, TX (US); David P. Branyon, San Antonio, TX (US); Timothy J. Callahan, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 115 days.

(21) Appl. No.: 14/595,993

(22) Filed: Jan. 13, 2015

(65) Prior Publication Data

US 2016/0201592 A1 Jul. 14, 2016

(51) Int. Cl.
*F02D 41/00* (2006.01)
*F02D 19/06* (2006.01)
*F02D 41/10* (2006.01)
*F02D 19/10* (2006.01)
*F02D 41/14* (2006.01)

(52) U.S. Cl.
CPC ....... *F02D 41/0002* (2013.01); *F02D 19/0642* (2013.01); *F02D 19/0647* (2013.01); *F02D 19/10* (2013.01); *F02D 41/0025* (2013.01); *F02D 41/10* (2013.01); *F02D 41/0007* (2013.01); *F02D 41/0027* (2013.01); *F02D 41/1458* (2013.01); *F02D 2041/1415* (2013.01); *F02D 2200/0402* (2013.01)

(58) Field of Classification Search
CPC .............. F02D 19/0642; F02D 19/0647; F02D 19/0694; F02D 19/081; F02D 41/0025; F02D 41/0027
USPC ..................... 123/436, 27 GE, 525, 526, 575
See application file for complete search history.

(56) References Cited

U.S. PATENT DOCUMENTS 8,909,457 B2 * 12/2014 Puckett .............. F02M 21/0281
123/27 GE

FOREIGN PATENT DOCUMENTS

WO WO 2015054657 A1 * 4/2015 ........... F02D 19/087

* cited by examiner

*Primary Examiner* — Mahmoud Gimie
(74) *Attorney, Agent, or Firm* — Livingston Law Firm

(57) ABSTRACT

A method, used with dual-fuel engine, of controlling the amount of diesel fuel delivered to the engine. The method compensates for the poor transient response of gaseous fueling. A controller receives a signal from the operator of the engine representing a desired torque, and based on this signal, determines a desired intake manifold state. It generates commands to various actuators to control the intake air and the intake gaseous fuel such that the desired intake manifold state will occur. The controller also receives sensor data from which the current in-cylinder state can be measured or estimated. It determines a current amount of diesel fuel based on the desired torque, the engine speed and the current in-cylinder state, and generates a diesel fueling command.

14 Claims, 3 Drawing Sheets

STATE-BASED DIESEL FUELING FOR IMPROVED TRANSIENT RESPONSE IN DUAL-FUEL ENGINE

TECHNICAL FIELD OF THE INVENTION

This invention relates to dual-fuel engines, and more particularly to improving the transient response of such engines.

BACKGROUND OF THE INVENTION

Dual-fuel engines, also referred to as bi-fuel engines, are internal combustion engines that operate on both a gaseous fuel and diesel fuel simultaneously. A common gaseous fuel for dual fuel engines is natural gas.

Typically, the diesel fuel is essentially for ignition; it auto ignites under compression and its combustion ignites the natural gas. Use of the diesel fuel retains the benefits of a diesel compression ratio and its efficiency, while use of the natural gas contributes to lowered emissions and fuel costs.

Natural gas can be introduced to the combustion chamber by either mixing it with the airflow or injecting it directly into the chamber. In a "fumigation" process, natural gas is mixed with air, and both enter the combustion chamber together in a desired proportion. In direct injection, the natural gas is introduced into the chamber just prior to burning.

A known issue with all gaseous-fueled engines, including dual-fuel engines, and especially those with fumigation-type or other "upstream" injection of gas, is poor transient response. This is due to the transport delay from the gaseous fuel injection point to the engine cylinders. This delay can result in slow up-transients as well as slow down-transients.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

As stated in the Background, a shortcoming of gaseous fueled engines is their poor transient response. The following description is directed to overcoming this deficiency in a dual-fuel (gaseous fuel and diesel) engine. A unique diesel fueling control system is used to compensate for the poor transient response of gaseous fueling.

Figure 1:
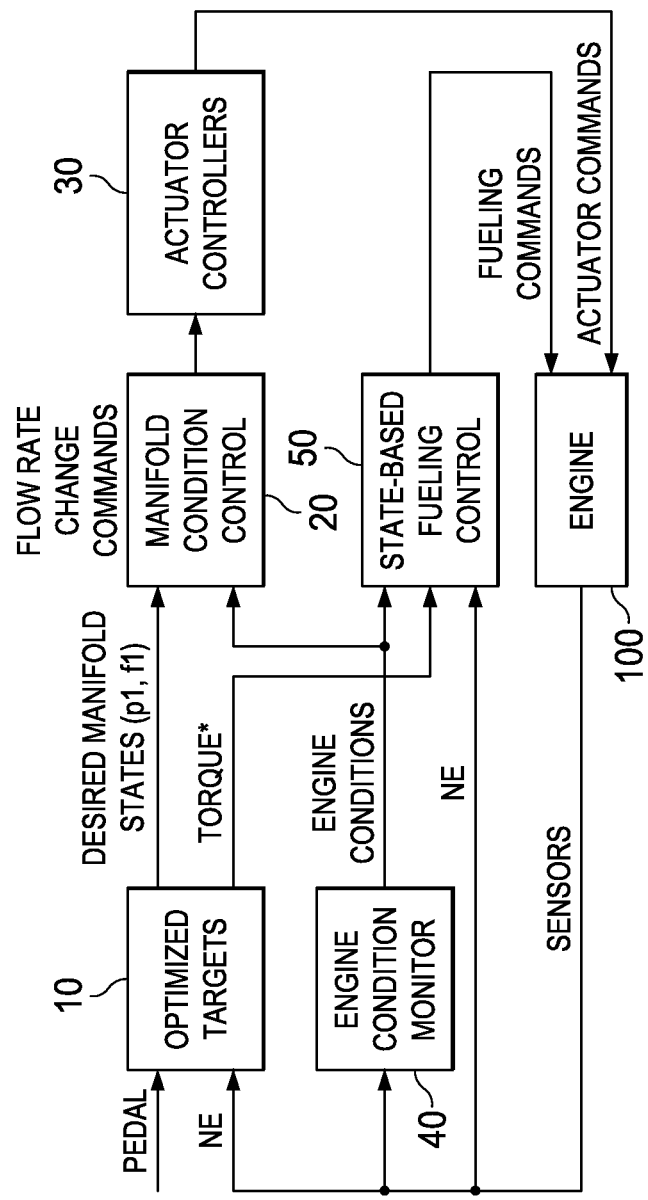
FIG. 1 illustrates a process of controlling diesel fuel delivered to a dual-fuel engine.

FIG. 1 illustrates an overview of the method and its control processes. The method is performed during engine operation and determines the amount of diesel fuel to be delivered via the engine's diesel fuel injectors.

More specifically and as further explained below, the dual-fuel engine 100 is equipped with a state-based diesel fueling process 50. State-based diesel fueling solves the problem of poor up-transients (a request for increased torque from the driver) by matching the quantity, timing, pressure, and pattern of diesel injection to the current in-cylinder state of the engine. This in-cylinder state includes the concentration/mass of in-cylinder gaseous fuel.

Figure 2:
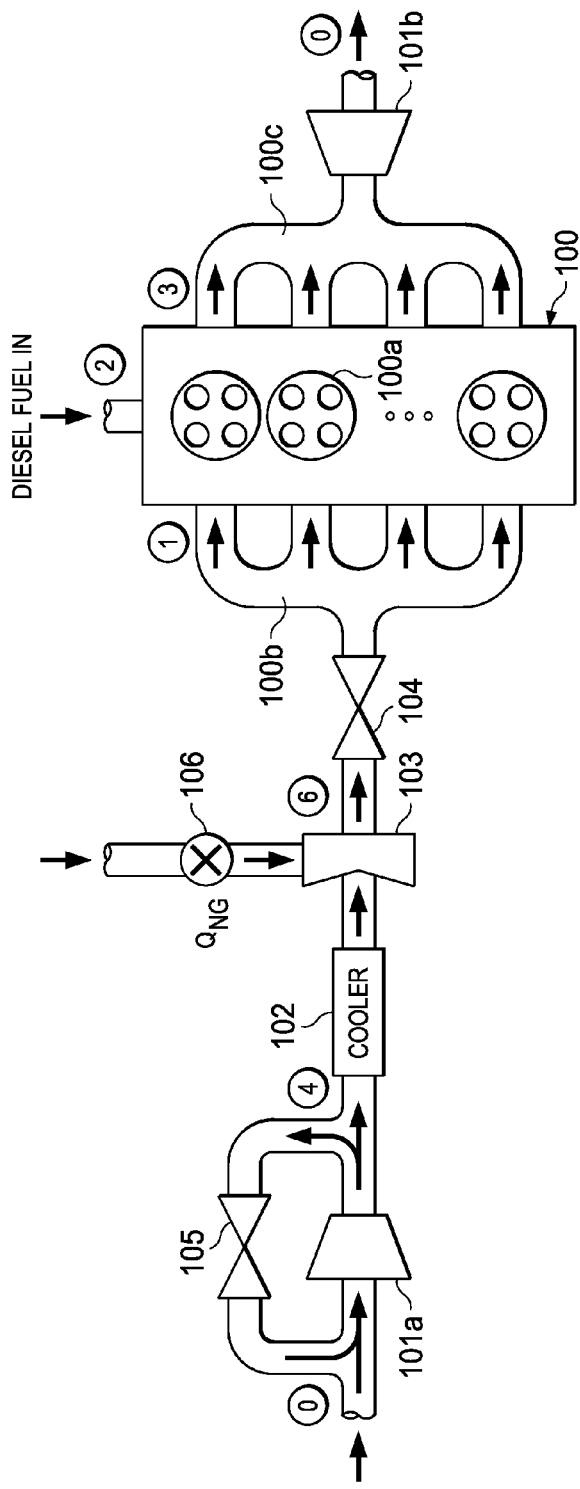
FIG. 2 illustrates the engine of FIG. 1 in further detail.

FIG. 2 illustrates a dual fuel engine 100 in accordance with the invention, that is, an engine equipped to use state-based diesel fueling to compensate for natural gas transport delays during up-transients. Dual fuel engine 100 has a number of cylinders 100a, an intake manifold 100b and an exhaust manifold 100c, each of which may be implemented with conventional engine parts.

Engine 100 is appropriately equipped to operate on dual fuel, that is, both diesel and a gaseous fuel. For purposes of this description, the gaseous fuel is assumed to be natural gas although the method described herein could be applied to control other gaseous fuels. More specifically, the same concepts could be applied to controlling fueling of other dual-fuel engines, such as those that use LPG, hydrogen, or biogas as the gaseous fuel.

Engine 100 is a turbocharged engine, having both a compressor 101a and turbine 101b, both of which may be positioned and used in a conventional manner. An optional bypass valve 105 may be used to control the amount of the fresh air intake charge. A cooler 102 cools the intake air downstream of the compressor 101a. A mixer 103 mixes the intake air with natural gas fuel. A throttle 104 controls the intake of air and natural gas into the intake manifold 100b.

Although this description is in terms of an engine equipped with a mixer 103, in other embodiments, the engine could be non-fumigated. That is, the gaseous fuel could be introduced directly into the engine cylinders.

Diesel fuel may be introduced into the engine cylinders 100a in a conventional manner. For purposes of example, it is assumed that diesel fuel is delivered via conventional fuel injectors, but other means could be used.

FIG. 2 further identifies various engine "nodes". Those relevant to this description are: 0 = ambient, 1 = intake manifold, 2 = in-cylinder, and 3 = exhaust manifold.

Referring to both FIGS. 1 and 2, the method controls diesel fuel delivered to the engine on a continuous basis during engine operation as the vehicle accelerates or slows. The vehicle accelerator pedal represents a request to increase torque from the driver (an up-transient). A target value process 10 receives input from the pedal and determines a desired torque value, Torque*.

Process 10 then uses this desired torque value to determine target values for two desired states of the intake manifold (node 1): intake manifold pressure, p1, and the fraction of oxygen, f1. These values are referred to herein as "desired values" or "target values" because as a result of driving these two intake manifold states to target values, a desired in-cylinder state can be achieved.

These target manifold states may be expressed as functions of specific engine condition values. They are determined by inputs such as desired torque and engine speed, $N_E$. Referring to the node designations of FIG. 2, the target O2 fraction after assumed stoichiometric consumption by natural gas (which subsequently occurs in-cylinder) is f1* and the target manifold pressure is p1*.

$$f1^* = f(\text{torque}^*, N_E, \ldots)$$

$$p1^* = f(\text{Torque}^*, N_E, \ldots)$$

The target manifold states are achieved by adjusting flows through various engine actuators. These flows include the natural gas mass flow, the fresh air flow and the bypass air flow.

A monitoring process 40 monitors current engine conditions. The process 40 receives "engine condition data" from various sensors associated with the engine. It uses these values, as well as stored models, to determine current engine conditions as the vehicle is in operation. These monitored engine conditions include the in-cylinder state (node 2), comprising the mass and/or concentration of oxygen ($O2_2$), natural gas ($NG_2$) and temperature ($T_2$). An additional monitored engine condition is the engine speed ($N_E$).

The values that comprise the current in-cylinder state may be estimated or measured. Although not explicitly shown in FIG. 2, various sensors may be used to obtain measured values. For values not measured directly, engine condition monitor 40 is programmed with models for estimating these values. Specific sensors that may be used are described below in connection with FIG. 4.

An intake manifold condition controller 20 receives the target manifold states, p1* and f1*, as well as values representing current engine conditions. Based on the target manifold states and the current engine conditions, controller 20 generates commands to change flow rates up or down. These "flow rate change commands" are delivered to the various control processes 30 for the flow actuators, which then control the appropriate actuators at the engine. These actuators include the natural gas control valve 106 and the intake throttle 104. If the engine is equipped with a bypass valve 105, its flow rate may also be adjusted. The result is the desired intake manifold state, and in turn, the desired in-cylinder state.

An example of a suitable control method for controlling flow rates is the "sliding mode" control described in U.S. Pat. No. 8,108,123, entitled "Sliding Mode Control System for Internal Combustion Engine", to Sarlashkar, et al., and assigned to Southwest Research Institute. That patent is incorporated by reference herein.

The current engine conditions are also delivered to a diesel fueling controller 50, which uses these values to determine a diesel fuel quantity to be delivered into the cylinders. The result is a fueling command to control the fuel injectors or other delivery means.

The diesel fuel quantity ($Q_D$) is based on engine speed ($N_E$), desired torque (Torque*), and the current in-cylinder state. The current in-cylinder state includes the in-cylinder oxygen concentration/mass and the in-cylinder gaseous fuel. Expressed as a function, where the gaseous fuel is natural gas:

$$Q_D = f(\text{Torque}^*, N_E, O2_2, NG_2, \ldots)$$

which notably includes $NG_2$, the in-cylinder amount of natural gas, as one of the factors for determining $Q_D$.

During an up-transient, $NG_2$ typically will be below that which is desired for the new desired torque. The diesel fuel quantity, however, is matched to the desired torque, thereby providing the torque target until the natural gas is delivered to the cylinders. In other words, torque during up-transients is similar to a diesel-only engine.

Figure 3:
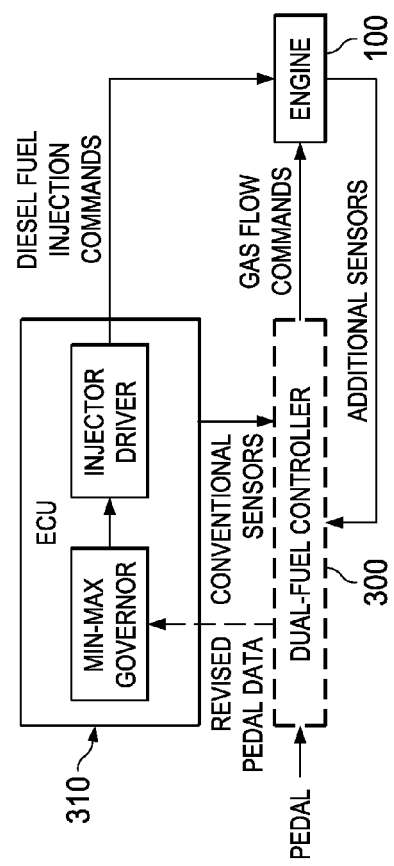
FIG. 3 illustrates how the control process of FIG. 1 can be implemented as a controller cooperating with a conventional engine control unit.

FIG. 3 illustrates a dual-fuel controller 300 and its relationship to engine 100 and a conventional diesel engine control unit (ECU) 310. As explained below, ECU is "conventional" in the sense that it need not be modified to implement the method described herein.

Dual-fuel controller 300 implements the various processes 10, 20, 40 and 50 illustrated in FIG. 1. It has appropriate hardware and software for performing the tasks described herein.

As explained above in connection with FIGS. 1 and 2, the control method implemented by dual-fuel controller 300 drives the engine to a desired in-cylinder state by controlling p1 and f1 to desired values. To this end, controller 300 generates various gas flow commands, specifically, commands for the natural gas flow valve, the throttle, and the bypass valve. Controller 300 also calculates a desired diesel fuel quantity value.

Controller 300 then maps this value to a revised pedal command, which is delivered to ECU 310. Thus, ECU 310 operates in a conventional manner, but with the pedal command having been modified by controller 300. The ECU 310 may be set to min-max governing mode and calibrated such that pedal position will correlate directly to fuel quantity. ECU 310 generates diesel fueling signals for delivery to the fuel injectors of engine 100.

As explained above, the method implemented by dual-fuel controller 300 calls for "engine condition data" from various sensors. ECU 310 delivers whatever data is available from conventional sensors. Additional sensor data, as needed for implementing the method, is delivered to or estimated by, dual-fuel controller 300.

Controller 300 generates control signals for the quantity of natural gas, NG, to be delivered to the engine. As the natural gas reaches the cylinder, the diesel fuel continues to be matched to the current in-cylinder condition and desired torque. There may be a minimum amount of diesel necessary to ignite the mixture of air and natural gas. The result is a seamless reduction in the diesel quantity.

Figure 4:
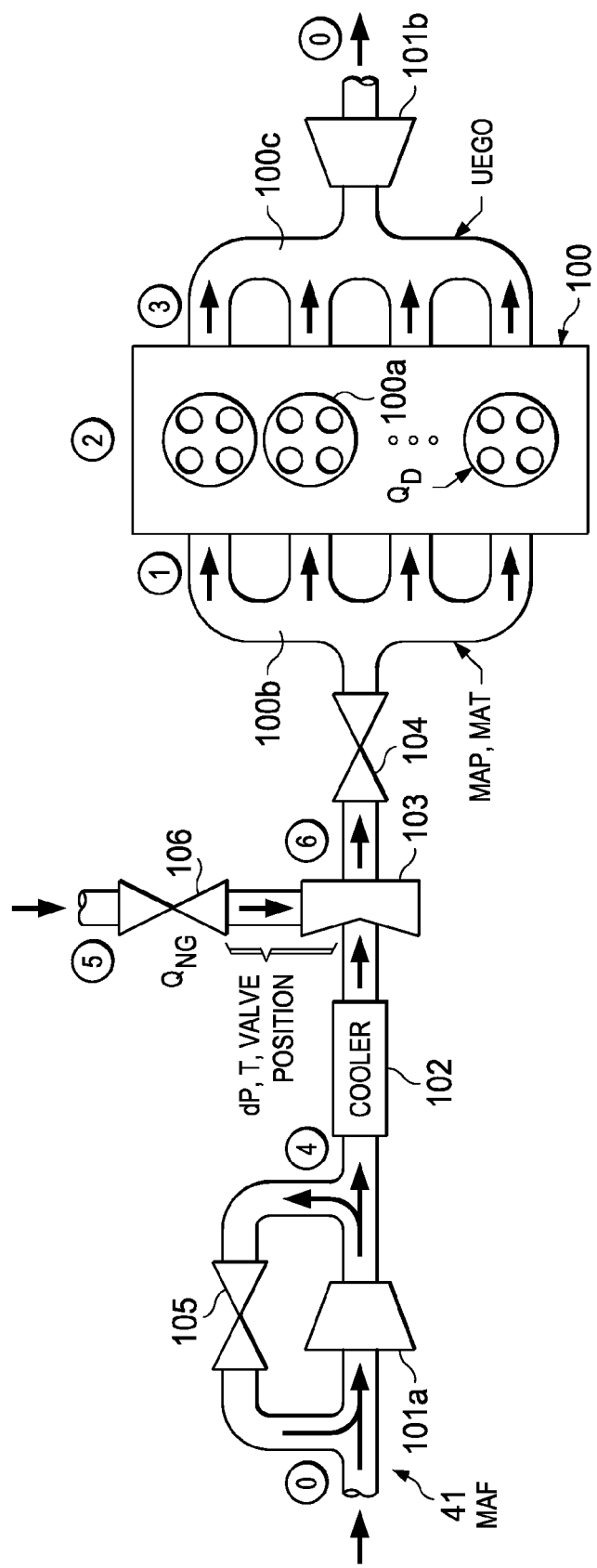
FIG. 4 illustrates various sensors that may be used to monitor engine conditions for the method of FIG. 1.

FIG. 4 illustrates various sensors for measuring engine conditions monitored by engine condition monitor 40. Which sensors are used may vary depending on the specific implementation of the method. A mass air flow sensor (MAF) 41 measures intake air flow. At mixer 103, sensors measure pressure difference, temperature and position of the natural gas valve. At the intake manifold, sensors measure pressure and temperature (MAP and MAT). An exhaust gas sensor (UEGO) measures oxygen in the exhaust, which can be used in algorithms that estimate in-cylinder oxygen.

Controlling the in-cylinder state by controlling manifold states, p1 and f1, accomplishes two objectives. The first, tracking of f1, ensures that the proper amount of natural gas is delivered as quickly as possible based on current torque demand.

The second objective addresses the issue of slow down-transients (reduced torque demand from the driver). A down-transient will result in a reduction in the desired p1. This will be accomplished, again, through modification of flows through the actuators. Reducing p1 is the quickest method of reducing flow into the cylinders, and thus the best method of reducing torque when there will be natural gas remaining in the manifold despite the flow of natural gas being discontinued. By controlling p1 with the throttle and optionally, also the compressor bypass valve, acceptable down-transient behavior is ensured.

What is claimed is:

1. A method of controlling the amount of diesel fuel delivered to a dual-fuel internal combustion engine, the engine being fueled with both gaseous fuel and diesel fuel, comprising:

receiving a signal from the operator of the engine representing a desired torque;

determining a desired intake manifold pressure and a desired intake manifold oxygen fraction, based on the desired torque;

controlling flow actuators for at least the intake air flow and the intake gaseous fuel such that the desired intake manifold pressure and the desired intake manifold oxygen fraction will occur;

receiving sensor data from which the engine speed and a current in-cylinder state can be measured or estimated;

wherein the current in-cylinder state comprises at least an in-cylinder amount of gaseous fuel and an in-cylinder amount of oxygen;

determining a current amount of diesel fuel based at least on the desired torque, the engine speed and the current in-cylinder state; and generating a diesel fueling command representing the current amount of diesel fuel.

2. The method of claim 1, wherein the receiving step is performed by receiving an accelerator pedal position signal.

3. The method of claim 1, wherein the desired intake manifold state comprises at least an intake manifold pressure value.

4. The method of claim 1, wherein the engine has a throttle, and the controlling flow actuators step is performed by controlling at least the throttle.

5. The method of claim 1, wherein the engine has a gaseous fuel intake valve, and the controlling flow actuators step is performed by controlling at least the gaseous fuel intake valve.

6. The method of claim 1, wherein the engine has a compressor and compressor by-pass valve, and the controlling flow actuators step is performed by controlling at least the compressor bypass valve.

7. The method of claim 1, wherein the gaseous fuel is natural gas.

8. A controller for controlling the amount of diesel fuel delivered to a dual-fuel internal combustion engine, the engine being fueled with both gaseous fuel and diesel fuel, and the engine having a conventional engine control unit, comprising:

a processor and memory system programmed to perform the following tasks: to receive a signal from the operator of the engine representing a desired torque; to determine a desired intake manifold pressure and a desired intake manifold oxygen fraction, based on the desired torque; to control flow actuators for at least the intake air flow and the intake gaseous fuel such that the desired intake manifold pressure and desired intake manifold oxygen fraction will occur; to receive sensor data from which the engine speed and a current in-cylinder state can be measured or estimated; wherein the current in-cylinder state comprises at least an in-cylinder amount of gaseous fuel and an in-cylinder amount of oxygen; to determine a current amount of diesel fuel based at least on the desired torque, the engine speed and the current in-cylinder state; and to generate a diesel fueling command representing the current amount of diesel fuel.

9. The controller of claim 8, wherein the controller receives an accelerator pedal position signal representing desired torque.

10. The controller of claim 8, wherein the desired intake manifold state comprises at least an intake manifold pressure value.

11. The controller of claim 8, wherein the engine has a throttle, and the controlling step is performed by controlling at least the throttle.

12. The controller of claim 8, wherein the engine has a gaseous fuel intake valve, and the controlling step is performed by controlling at least the gaseous fuel intake valve.

13. The controller of claim 8, wherein the engine has a compressor and compressor by-pass valve, and the controlling step is performed by controlling at least the compressor bypass valve.

14. The controller of claim 8, wherein the gaseous fuel is natural gas.

* * * * *